INVENTORS
LEONARD LEO McGEE
ROGER KEITH PARKER

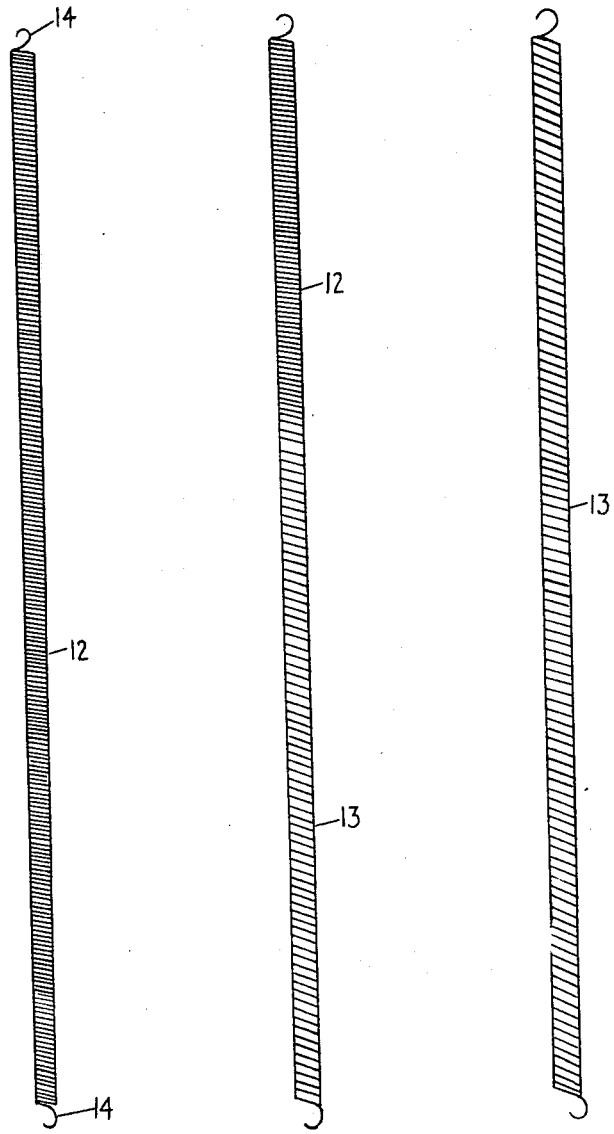

3,260,655
FILM DISTILLATION WITH A HELICAL SPRING
Leonard Leo McGee and Roger Keith Parker, Manchester, England, assignors to Imperial Chemical Industries Limited, London, England, a corporation of Great Britain
Filed May 24, 1962, Ser. No. 197,424
Claims priority, application Great Britain, May 25, 1961, 18,919/61
7 Claims. (Cl. 203—89)

This invention relates to improvements in or relating to methods and apparatus for the volatilisation of liquids and for effecting interchange of material between liquid and vapour phases, and in particular to the forming of a thin liquid film which is the desirable factor in efficient evaporation, fractionation and molecular distillation.

Many types of equipment have been described for the volatilisation of liquids, but none have the versatility of the apparatus herein described. Thus apparatus which has been proposed for the evaporation of liquids is not normally easily adapted for fractional distillation and similarly apparatus designed and proposed for fractional distillation of liquids is not normally suitable for molecular distillation.

It has now been found that an apparatus such as is herein described in which volatilisation takes place from a thin liquid film spread and agitated on the sides of a cylindrical tube by coiled helical springs mounted parallel to the sides of the tube and whose longitudinal axes describes a circular motion about the central axis of the tube is adaptable for use in evaporation, distillation, fractionation and molecular distillation.

Thus according to the present invention there is provided an apparatus for the volatilisation of a liquid from the surface of a thin liquid film, comprising a cylindrical tube, closed at both ends and supported at an angle to the horizontal, means for heating said tube, an inlet at the upper end of the tube for the introduction of liquid on to the inner wall of the tube, an exit pipe above the inlet at the upper end of the tube and another exit pipe at the lower end of the tube, a rotatable shaft centrally aligned and mounted in said tube, characterised in that there is mounted on said rotatable shaft one or more helical springs in close proximity to the inner wall of the tube with the longitudinal axes parallel to the central axis of the tube and so adapted that on rotation of the central shaft the longitudinal axes of the spring or springs prescribe a circular motion about the central axis of the tube.

The cylindrical tube may be of any suitable dimensions but it has been found advantageous to have the dimensions of the tube such that the ratio of the length to the diameter is from 5:1 to 50:1.

The cylindrical tube and the other component parts of the apparatus may be fabricated from any suitable material of construction, for example glass, stainless steel or alloy metals.

The cylindrical tube may be supported vertically or at any angle to the horizontal, it has been found that when the residue from the volatilisation is a solid it is advantageous to mount said tube at an angle of from 10° to 40° to the horizontal.

The cylindrical tube may be heated by any convenient means for example by electrical heating or by surrounding the tube with a jacket of heated vapour, such as steam, or by a jocket of heated liquid.

The rotatable shaft which is mounted along the central longitudinal axis of the tube may be so mounted by any convenient means for example the shaft may pass through glands set centrally in the upper and lower ends of the tube or may pass through a gland at the upper end of the tube and rest on a suitable mounting or bearing fixed at the lower end of the tube.

The speed of rotation of the aforesaid shaft may vary considerably over wide limits but it has been found advantageous to rotate the said shaft at higher rather than lower speeds and it is preferred that the shaft should revolve at such a speed that the peripheral velocity of the springs is in excess of 10 in. per sec.

The speed of rotation of the shaft and attached coils is normally varied according to the operation for which the apparatus is being used. For example in evaporation a peripheral velocity of the springs of 20 ins. per sec. is suitable and for use of the apparatus in fractionation a peripheral velocity of the springs of about 30 ins. per sec. has been found satisfactory. When the residual unvolatilised material, for example in evaporation, is a solid a peripheral speed of about 50 ins. per sec. has been found suitable for grinding the solid to a fine powder. In molecular distillation lower peripheral speeds of 10 ins. per sec. have been found satisfactory.

The helical spring or springs may be mounted on the rotatable shaft by any convenient spring-carrying assembly such as an assembly of arms and brackets projecting from the said shaft and holding the helical spring or springs in close proximity to the inner wall or surface of the cylindrical tube.

It has been found that the efficiency of the apparatus when used for evaporation or fractionation may be increased by fitting baffles or baffle plates to the rotatable shaft. Thus in a preferred embodiment of the apparatus of the present invention baffles or baffle plates consisting of sheets of suitable constructional material such as steel or alloy metal are mounted on the rotatable shaft.

In large scale models of the apparatus it is often desirable to replace the baffles by a cylindrical tube, closed at the top, in order to restrict the free space and to maintain more intimate contact between, in evaporation volatiles and inert gas and in fractionation the ascending vapour and the returning reflux liquid. Thus in a preferred embodiment of the apparatus of the present invention an inner cylindrical tube, closed at the upper end, of smaller dimensions than the hereinbefore defined cylindrical tube, is mounted on the rotatable shaft, the helical spring or springs being mounted on the outside surface of said inner cylindrical tube.

There may be only one helical spring mounted on the rotatable shaft or on the additional cylinder in the manner above defined but it is a preferred feature of the invention that a number of helical springs should be so mounted.

The helical springs may be composed of any number of turns and the individual turns may be of any suitable conformation for example they may be circular, rectangular or square.

The helical spring or springs may be constructed by winding wire, for example of Nichrome or stainless steel, into a helix along the surface of a rod former and removing the former to give a flexible spring-like coil which may be of any desired length or diameter and in which the individual turns of the coil may be open or close wound to any desired degree. The gauge or wire used to make the coils may vary according to the type of material which is being subjected to volatilisation, the physical form of the residue after volatilisation and to the size and scale of the apparatus. For example the spring-like coils may be close wound for the whole of their length, this is preferred when the volatilisation residue is liquid.

Alternatively when the volatilisation residue is a solid it is preferred that the first or upper portion of the coil-like springs be close wound and that the second or lower portion of the springs should be open wound, if necessary of heavier gauge wire, in order to grind the solid volatilisation residue to a fine powder and ensure complete removal of the volatile material. In evaporation the efficiency of the apparatus of the present invention is also further enhanced by the passage of a stream of inert gas in an upwards direction through the cylindrical tube. Thus in a further preferred embodiment of the apparatus of the present invention there is provided an additional inlet at the lower end of the said cylindrical tube for the introduction of a stream of inert gas.

The invention is illustrated but not limited by the accompanying drawings in which—

FIGS. 5, 6 and 7 are views of the helical springs which may be used in the various embodiments of the invention.

Figure 1:
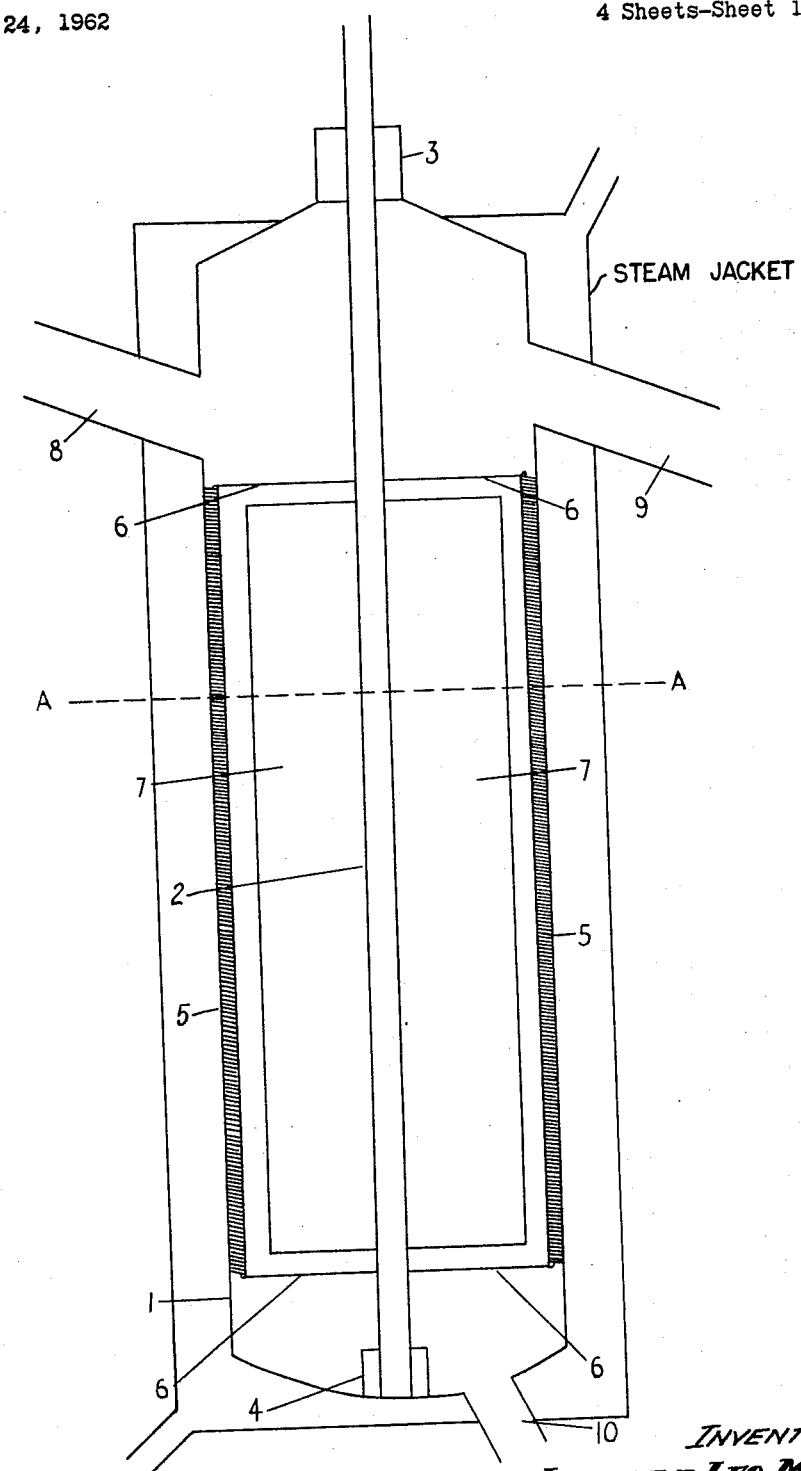
FIG. 1 is a vertical section of an embodiment of the invention incorporating the baffle plates mounted on the rotatable shaft.

In the drawings, the cylindrical tube 1 carries a centrally aligned rotatable shaft 2 which enters the tube through a vacuum tight gland 3 and is supported in a bearing 4 fitted to the base of the tube. The helical springs 5 are mounted on the rotatable shaft 2 by means of arms 6 which hold the helical springs in close proximity to the inner wall of the cylindrical tube 1. Baffle plates 7 are also mounted on the rotatable shaft 2. The cylindrical tube 1 has a feed inlet 8, an exit pipe 9 leading to a condenser and receiver (not shown in the drawings) and a pipe 10 at the lower end of the tube 1 leading to a receiver (not shown) and to a source of inert gas.

Figure 3:
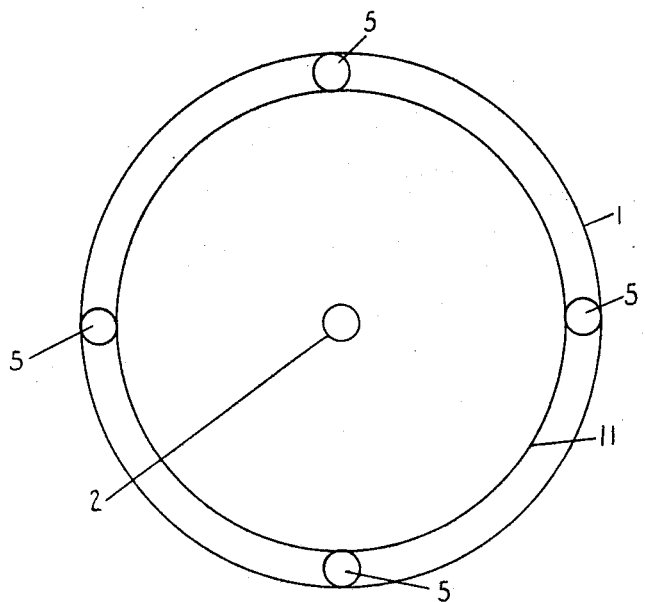
FIG. 3 is a cross section across A—A of another embodiment of the invention in which the free space within the tube is restricted by a cylindrical tube mounted on the rotatable shaft.

In the embodiment shown in cross-section in FIG. 3 the helical springs 5 are mounted on the outer surface of the inner smaller cylinder 11 which is itself mounted on the rotatable shaft 2.

Figure 4:
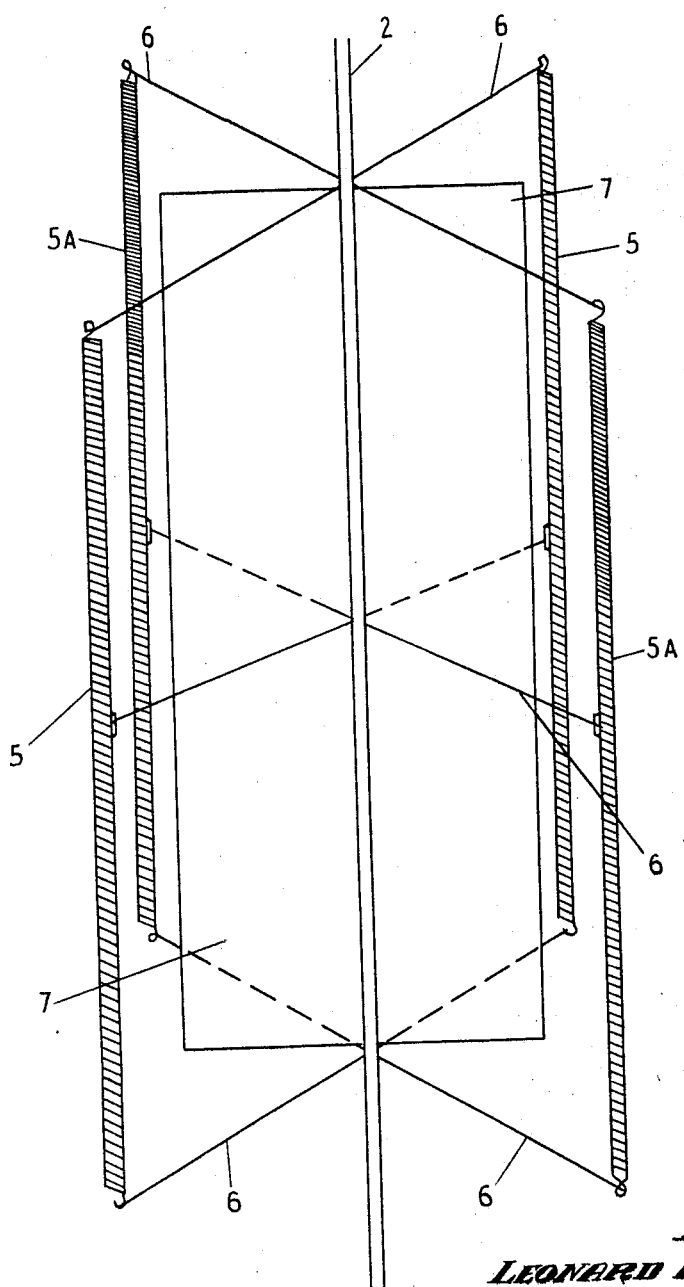
FIG. 4 is a view in perspective of the helical springs and spring-carrying assembly of one embodiment of the invention incorporating rotatable baffle plates.

In FIG. 4 the upper portion of the helical springs 5A is close wound and the lower portion is more open wound, the helical springs 5 are open wound for the whole of their length.

In FIG. 5 the helical spring is composed of closely wound coils 12 for the whole of its length, the spring in FIG. 6 is composed of closely wound coils 12 and open wound coils 13. The spring shown in FIG. 7 consists entirely of open wound coils. The springs are hooked 14 for attachment to the mounting arms 6.

Figure 2:
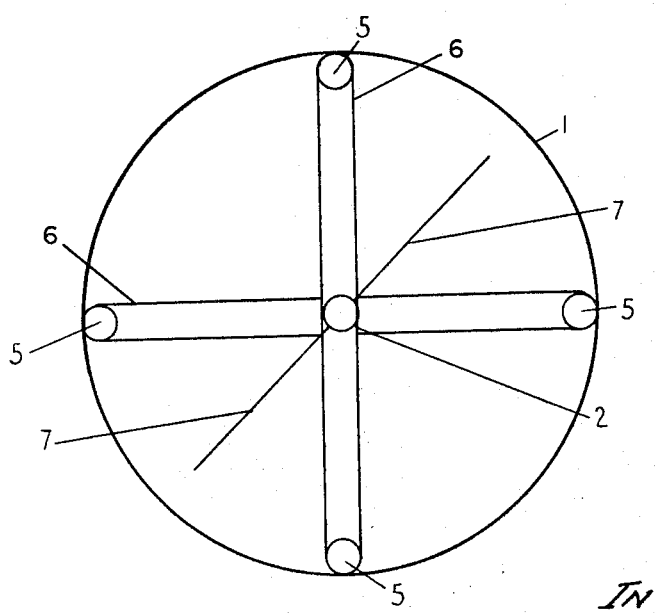
FIG. 2 is a horizontal cross section of the apparatus illustrated in FIG. 1 taken across A—A.

When the embodiment of the invention shown in FIGS. 1 and 2 is in use for example for evaporation the material to be volatilised is introduced into the heated tube via the feed inlet 8 and flows down the inner walls of the tube 1 where it is spread into a thin film on the said inner wall and continuously agitated during its passage down the tube by the helical springs. When the rotatable shaft 2 is rotated at a high speed the helical springs 5 mounted thereon by the arms 6 are thrown against the sides of the tube by centrifugal force and continuously agitate and change the volatilisation surface, the baffles 7 also mounted on the rotating shaft agitate the stream of vapour and inert gas passing upward through the tube. The inert gas is introduced through pipe 10 and the stream of inert gas and volatilised material passes out of the tube through the exit pipe 9 to a condenser and receiver. The residual unvolatilised material flows down the tube, flows out through the pipe 10 and is collected in a suitable receiver.

Volatilisation in the apparatus of the present invention may be carried out at any suitable pressure but in the case of heat sensitive liquids it is advantageous to carry out the volatilisation under reduced pressure. In order to achieve conditions of reduced pressure, vacuum may be applied to the apparatus through a receiver used for collecting the volatile material.

Volatilisation equipment embodying the present invention is useful in continuous or batchwise fractionation, evaporation, distillation or molecular distillation.

In efficient fractionation film formation of the returning reflux liquid is very important as it provides a large surface area for a small volume of liquid and therefore promotes intimate contact with the rising vapour which is an essential part of high efficiency column packings. Volatilisation apparatus which incorporates our invention consists basically of an empty tube free from conventional packing and yet with a large and constantly changing liquid surface for intimate contact with rising vapours. Such apparatus is very useful for the fractionation of heat sensitive materials and will give improved performance with such materials. In continuous fractionation the bottom portion of the tube or column may be used as the boiler and therefore the contact time with the heated surface is exceedingly short and so decomposition is minimised. On large scale models the reduction of the excessive free space and fulfilment of the above conditions is achieved by the use of a rotating cylinder of less diameter than the tube attached to the rotatable shaft and which carries the coiled spring sweeps mounted on arms on its outer surface and which is closed at the top thus ensuring restriction of the gas and vapour flow to the annular space between the tube and cylinder walls.

Stills which embody the principle of the present invention are useful for molecular distillation. Distillation of this type is usually concerned with relatively high molecular weight materials which are generally heat sensitive at their distillation temperatures and therefore require a short heat contact time; it is also essential in materials of this nature which have considerable viscosity that the surface be agitated and so renewed to prevent formation of a relatively impervious layer which may obstruct the passage of the lighter molecules from the body of the liquid. The present invention is ideal for this operation as the contact time is short and the construction of the coiled spring sweeps is such that the cutting or knife-like action of the individual coils constantly renews the surface. The rotating cylinder is again incorporated where it acts as the condensing and collecting surface.

In distillation or evaporation of liquids the use of a still incorporating the present invention presents many advantages over the use of conventional packed column and non-agitated falling film types of evaporation and distillation equipment which has previously been described. Film formation and the agitation of the film by the knife-like action of the individual coils of the coil sweeps aids heat transfer, thus reducing the heating time which is very important with heat sensitive materials, and continually renews the distillation surface allowing the more volatile material to escape. This latter feature is most valuable where the undistilled material is of high viscosity. In distillations or evaporation in which the residue remaining after distillation or evaporation is a solid, the coil-like sweeps used in the present invention possess particular advantages in that the cutting action of the individual coils grinds the solid to a fine powder and that they satisfactorily agitate the film at the transition stage between liquid and solid at which the film may be in a highly viscous state.

An additional advantage of the apparatus of the present invention is the flexibility of the helical springs. This leads to their being pressed against the walls by the centrifugal force arising from their rotation and even though the walls may not be perfectly even a relatively uniform film of liquid, or of a liquid-solid mixture, is obtained.

Although the invention has been described in some detail it will be understood that variations and modifica-

What we claim is:

1. An apparatus for the volatilisation of a liquid from the surface of a thin liquid film, comprising a cylindrical tube, closed at both ends and supported at an angle to the horizontal, means for heating said tube, an inlet at the upper end of the tube for the introduction of liquid on to the inner wall of the tube, an exit pipe above the inlet at the upper end of the tube and another exit pipe at the lower end of the tube, a rotatable shaft centrally aligned and mounted in said tube, characterised in that there is mounted on said rotatable shaft one or more helical springs in close proximity to the inner wall of the tube with the longitudinal axes parallel to the central axis of the tube and so adapted that on rotation of the central shaft the longitudinal axes of the spring or springs prescribe a circular motion about the central axis of the tube.

2. An apparatus as claimed in claim 1 wherein the ratio of the length of said cylindrical tube to the diameter thereof is from 5:1 to 50:1.

3. An apparatus as claimed in claim 1 wherein said rotatable shaft is adapted to revolve at such a speed that the peripheral velocity of the helical springs is in excess of 10 inches per second.

4. An apparatus as claimed in claim 1 wherein said rotatable shaft carries baffles or baffle plates mounted thereon and rotatable therewith.

5. An apparatus as claimed in claim 1 wherein there is mounted on said rotatable shaft an inner cylindrical tube, closed at the upper end, of smaller dimensions than the said cylindrical tube, with one or more of said helical springs mounted on the outside surface of said inner cylindrical tube.

6. An apparatus as claimed in claim 1 wherein an additional inlet adapted for the introduction of inert gas is provided at the lower end of said cylindrical tube.

7. A process for volatilizing and separating a liquid from a mixture comprising: directing the mixture onto the upper region of a cylindrical surface supported at an angle to the horizontal, heating said surface, continuously traversing said surface with a helical spring having a longitudinal axis substantially parallel to the longitudinal axis of said surface thereby spreading a thin film of said mixture over said surface, agitating said film and advancing the residue of the mixture downwardly along said surface; collecting liquid volatilized from said spring and said surface near the upper region of the surface and collecting the residue of said mixture near the lower region of said surface.

References Cited by the Examiner

UNITED STATES PATENTS

| | | | |
|---|---|---|---|
| 89,749 | 5/1869 | Fleischmann | 203—89 |
| 2,242,466 | 5/1941 | Greenwalt et al. | 260—537 |
| 2,370,462 | 2/1945 | Hecker | 202—52 |
| 2,749,292 | 6/1956 | Perry et al. | 202—205 |
| 2,890,155 | 6/1959 | Bueche | 202—236 X |

FOREIGN PATENTS

| | | |
|---|---|---|
| 429,285 | 1/1948 | Italy. |
| 249,628 | 5/1948 | Switzerland. |

NORMAN YUDKOFF, *Primary Examiner.*

GEORGE D. MITCHELL, *Examiner.*

J. B. DONIHEE, M. H. SILVERSTEIN,
*Assistant Examiners.*